United States Patent Office 3,792,043
Patented Feb. 12, 1974

3,792,043
PROCESS FOR CONVERTING COMPOUNDS CONTAINING A CYCLIC SULFUR GROUP TO ALDEHYDES OR KETONES
Hsin-Lan Wang Chang, Piscataway, N.J., assignor to E. R. Squibb & Sons, Inc., Princeton, N.J.
No Drawing. Filed Dec. 2, 1971, Ser. No. 204,303
Int. Cl. C07c
U.S. Cl. 260—239.55 D
9 Claims

ABSTRACT OF THE DISCLOSURE

Compounds having a 1,3-dithiolane, 1,3-dithiane, 1,3,5-oxadithiane or 1,3,5-trithiane substituent are converted to aldehyde or ketones by treating with certain organic halides or sulfates.

SUMMARY OF THE INVENTION

This invention relates to a process for the production of aldehydes or ketones from compounds which have a 1,3-dithiolane, 1,3-dithiane, 1,3,5-oxadithiane or 1,3,5-trithiane substituent by treating these compounds with certain organic halides or sulfates in aqueous alkanol solution to convert the cyclic sulfur group to a carbonyl group.

BACKGROUND OF THE INVENTION 1,3-dithiolanes and 1,3-dithianes are frequently used to protect carbonyl groups during various chemical syntheses. At an appropriate point, the product is treated to convert the protective group to the carbonyl group. The compound with the protected carbonyl group, i.e., with the cyclic sulfur containing group in place, has frequently been found to be quite stable and resistant not only to the chemical treatment against which it serves as a protector, but also to the hydrolyzing agent which cleaves the dithiolane or dithiane.

Welfrom [J.A.C.S., 51, 2188 (1929)] has reported the cleavage of dithiolane with mercuric chloride to regenerate the carbonyl group. Vedegs and Fuchs [J. Org. Chem., 36, 366 (1971)] proposed the use of mercuric oxide and water. Seebach [Synthesis, 1, 17 (1969)] disclosed the use of N-bromosuccinimide at temperatures of about —5° to —10° C. Adams et al. [J. Chem. Soc., 2649 (1960)] reported the use of silver nitrate to hydrolyze 1,3-dithiolanes. Daum and Clark [Tetrahedron Letters, No. 2, 165 (1967)] oxidized the 1,3-dithiolane of cholestan-3-one with a peracid to the corresponding disulfone and then effected the cleavage with sodium methoxide or sodium ethoxide. Emerson and Wynberg [Tetrahedron Letters, 37, 3449 (1971)] used chloramine-T to regenerate carbonyl compounds from the 1,3-dithiolane.

Various problems are associated with these methods. The two methods using mercury compounds introduce mercury pollution and other disadvantages. The handling at low temperatures is disadvantageous in the method of Seebach. Silver compounds are expensive and hard to remove in the method of Adams et al. The method of Daum and Clark is applicable only to molecules not sensitive to the strong oxidizing agents. The chloramine-T method of Emerson and Wynberg does not have as great success with certain steroids.

It has now been found that an improved process comprises heating a compound of the formula

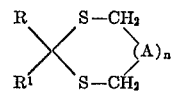

with a compound of the formula $R^2X$ in an aqueous alkanol solution to form an aldehyde or ketone.

DETAILED DESCRIPTION OF THE INVENTION

According to this invention, a compound of the formula (I)
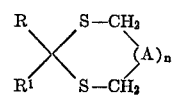

is converted, by heating it in aqueous alkanol solution, with a compound of the formula (II)                $R^2X$ to obtain a product with the carbonyl function having the formula (III)

R and $R^1$ may each represent an acyclic or cyclic group or the two together may form with the carbonyl group a cyclic ketone. Either R or $R^1$ may thus individually be an unsaturated or saturated alkyl group, unsaturated or saturated cycloalkyl, a carbocyclic aryl group which may be monocyclic or polycyclic, or an aralkyl group or R and $R^1$ may together form the residue of a cyclic ketone, i.e., an alicyclic group or a carbocyclic aryl group of the type just referred to. R may also represent hydrogen, in which case an aldehyde is involved. $R^1$ may also be the residue of a keto ester like —COO— lower alkyl or —$CH_2COO$— lower alkyl.

$R^2$ may represent saturated or unsaturated alkyl or benzyl.

A is methylene, oxygen or sulfur.

n is 0 or 1.

X is one of the halogens, chlorine, bromine or iodine or the sulfate ion.

The alkyl groups may be straight or branched chain saturated or unsaturated hydrocarbon groups, e.g., alkyl groups and alkenyl groups having one or two double bonds, each type having up to about twelve carbon atoms, especially the lower alkyl groups of up to eight carbon atoms, for example, methyl, ethyl, propyl, isopropyl, butyl, isobutyl, t-butyl, amyl and the like, and their mono-unsaturated, double bonded analogs as well as acetylenic groups having one triple bond up to about four carbon atoms. Carbocyclic aryl groups include rings such as benzene, naphthalene, anthracene, fluorene and the like. The aralkyl groups include such rings attached to a lower alkyl group of the type referred to above. Also included are polycyclic compounds of which the steroids are a particular example. Various series of steroids are included, especially steroids of the pregnane series (including the corticoids having a 21-hydroxy or acyloxy group) and the androstane series, and the invention is particularly directed to the carbonyl groups in the 3-, 17- and 20-positions of the steroids [see J.A.C.S., 69, 562 (1947)].

The cycloaliphatic groups represented by R and $R^1$ include the alicyclics of three to seven carbon atoms such as cyclopropyl, cyclobutyl, cyclopentyl, cyclohexyl or cycloheptyl, including those with one or two double bonds, especially the 5- and 6-membered groups. R and $R^1$ may also together form one of the foregoing alicyclic groups.

All of the foregoing groups may be simply substituted, e.g., bearing one or more substituents such as esters, amides, ethers, cyano or nitro groups as well as additional carbonyl groups. The steroids may include the well known substituent groups, e.g., in the 2, 4, 6, 9, 11, 12, 14, 15, 16, 17 and 21- positions.

Illustrative aldehydes and ketones which may be obtained by the process of this invention include those in the illustrative examples as well as valeraldehyde, caproaldehyde, enanthaldehyde, isobutyraldehyde, propiolaldehyde, benzophenone, cyclopentanone, fluorenone, cholestan-3-one, ethyl acetoacetate and the like.

Various halides and sulfates of Formula II may be used to react with the compound of Formula I. Lower alkyl halides are preferred. The alkyl group may include up to eight carbon atoms but the lowest two members are especially preferred. Illustrative halides are methyl iodide, methyl bromide, methyl chloride, ethyl iodide, ethyl bromide ethyl chloride, allyl chloride, propargyl bromide, benzyl bromide, cyclohexenyl bromide, propargyl iodide, allyl bromide and the like. Methyl iodide is the first choice. A preferred group of halides are those wherein $R^2$ is lower alkyl, benzyl, allyl or propargyl, especially those wherein the halogen is iodine or bromine.

The sulfates include lower alkyl sulfates, especially di-(lower alkyl) sulfates like dimethyl sulfate (which is preferred), diethyl sulfate and the like.

The 1,3-dithiolanes of Formula I above are produced by the reaction of an aldehyde or ketone with a dithiol, e.g., ethanedithiol or propanedithiol, in the presence of acid, zinc chloride or boron trifluoride etherate.

Alternatively, acyclic dithianes of Formula I are produced by the stepwise alkylation of a 1,3-dithiane as follows:

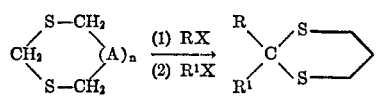

in the presence of a strong base (e.g., alkyl lithium like n-butyl lithium) in a solvent such as ether [Seebach, Synthesis, 1, 17 (1969)]. X in the foregoing represents halogen, preferably bromine or chloride.

The treatment of the 1,3-dithiolane, 1,3-dithiane, 1,3,5-oxadithiane or 1,3,5-trithiane derivative or protected compound with the halide or sulfate of Formula II is effected by heating a mixture of the 1,3-dithiolane, 1,3-dithiane, 1,3,5-oxadithiane or 1,3,5-trithiane derivative with the halide or sulfate in an aqueous alkanol solvent at a temperature within the range of about 25° to 200° C., preferably about 50° to 150° C.

The mole ratio of the halide or sulfate to the cyclic dithiolketals being converted to the carbonyl containing product may vary within relatively broad limits, e.g., within the range of about 1:1 to about 30:1, preferably about 1:10.

The time of contact of the reactants may also vary within the relatively broad limits, i.e., within the range of about 15 min. to 20 hours.

The reaction medium is preferably an aqueous alcohol solution containing about 30 to 96% by volume of a lower alkanol such as methanol, ethanol, isopropanol, n-butanol or the like.

This process of producing aldehydes and ketones is especially adaptable to a method of protecting carbonyl groups during various chemical syntheses. The dithiolane, dithiane, oxadithiane and trithiane groups are acid stable protective groups which may now be removed according to this invention under mild conditions. This allows other functional groups to be present without removal or disruption. After formation of the dithiolane, treatments such as a Grignard reaction, reduction with lithium aluminum hydride, etc. may be performed. The protective group is then readily removed according to this invention to regenerate the aldehyde or ketone.

The following examples are illustrative of the process of the invention. All temperatures are on the centigrade scale.

EXAMPLE 1

1.32 g. of the 3-(ethylenedithioketal) of 9α-fluoro-16α-hydroxycortisone acetonide is heated under reflux with 2.96 ml. of methyl iodide in 15.6 ml. of 96% methanol for 20 hours. The methanol and excess methyl iodide are removed by evaporation and the residue is diluted with small amounts of water. The aqueous mixture is extracted with ether. The combined ether extracts are washed with 2 N sodium hydroxide and water until neutral. After removal of the ether, 0.93 g. of product, 9α-fluoro-16α-hydroxycortisone acetonide is obtained (83%), M.P. 268–270°.

EXAMPLE 2

The procedure of Example 1 is followed but substituting 4.31 ml. of dimethyl sulfate for the methyl iodide. The product is identical with that obtained in Example 1.

EXAMPLE 3

The ethylenedithioketal of cyclohexanone is heated under reflux for ½ hour with methyl iodide in 95% ethanol according to the procedure of Example 1 and cyclohexanone is obtained.

EXAMPLE 4

The propylenedithioketal of acetophenone is heated under reflux for 2 hours with methyl iodide in 85% methanol according to the procedure of Example 1 to obtain acetophenone.

EXAMPLE 5

The ethylenedithioacetal of benzaldehyde is heated under reflux for one hour with methyl iodide in 80% methanol according to the procedure of Example 1 to obtain benzaldehyde.

EXAMPLE 6

The propylenedithioketal of ethyl pyruvate is heated under reflux for 2 hours with methyl iodide in 95% ethanol; ethyl pyruvate is obtained.

EXAMPLE 7

A mixture of 2-phenyl-2-methyl-1,3,5-trithiane and methyl iodide in 85% methanol is heated under reflux for 8 hours as in Example 1 to obtain acetophenone.

The following additional products are obtained by the procedure of Example 1:

| Example | R | R¹ | R² | X | Solvent | Reaction Temp. | Time (hr.) | R | R¹ |
|---|---|---|---|---|---|---|---|---|---|
| 8 | Phenyl | —H | CH≡C—CH₂ | Br | 90% methanol | Reflux | 8 | Phenyl | —H. |
| 9 | n-Butyl | n-Amyl | CH₂=CHCH₂ | Cl | 80% propanol | do | 15 | n-Butyl | n-Amyl. |
| 10 | 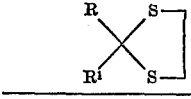 | —CH₃ | 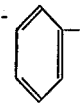 | Br | 80% methanol | do | 15 | 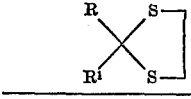 | —CH₃. |
| 11 | R and R₁ together | 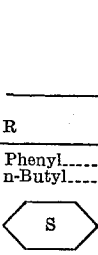 | CH₃ | Br | 90% ethanol | do | 10 | R and R₁ together | 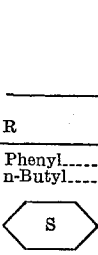 |
| 12 | R and R¹ together | 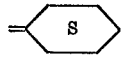 | CH₃ | I | 90% methanol | do | 20 | R and R¹ together | 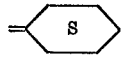 |
| 13 | —H | —H | CH₃ | I | do | do | 5 | —H | —H. |
| 14 | Phenyl | —CH₃ | (CH₃)₂ | SO₄ | do | do | 3 | Phenyl | —CH₃. |

EXAMPLE 15

A mixture of 2-phenyl-2-methyl-1,3,5-trithiane (0.5 gm.) and methyl iodide (1.6 gm.) in 85% methanol (30 ml.) is heated under reflux for 8 hours and acetophenone is obtained.

EXAMPLE 16

A mixture of 2-butyl-1,3,5-trithiane (0.5 gm.) and dimethyl sulfate (1.5 gm.) in 90% methanol (30 ml.) is heated under reflux for 5 hours and butylaldehyde is obtained.

EXAMPLE 17

A mixture of 2-methyl-2-propyl-5-oxa-1,3-dithiane (0.5 gm.) and methyl iodide (1.6 gm.) in 85% isopropanol (30 ml.) is heated under reflux for 2 hours and 2-pentanone is obtained.

EXAMPLE 18

A mixture of 2-phenyl-1,3-dithiane (0.5 gm.) and an excess amount of methyl iodide (2 gm.) in 80% methanol (30 ml.) is heated under reflux for 2 hours and benzaldehyde is obtained.

What is claimed is:

1. A process for the production of a steroidal ketone of the formula

wherein R and R¹ together form the cyclopentanophenanthrene nucleus and the carbonyl group is in the 3-, 17-, 20-position, which comprises reacting a compound of the formula

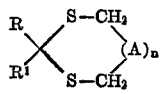

wherein R and R¹ together form the cyclopentanophenanthrene nucleus and join the sulfur containing ring in the 3-, 17- or 20-position of said nucleus, A is methylene, oxygen or sulfur, and $n$ is 0 or 1, with a compound of the formula

R²X wherein R² is saturated or unsaturated lower alkyl or benzyl and X is halogen or sulfate, in an aqueous alkanol solvent solution.

2. A process as in claim 1 wherein A is methylene and $n$ is 1.

3. A process as in claim 1 wherein $n$ is 0.

4. A process as in claim 1 wherein the reaction is effected by heating in aqueous methanol or ethanol solvent.

5. A process as in claim 1 wherein R²X is methyl iodide.

6. A process as in claim 1 wherein the ratio of the R²X reactant to the cyclic sulfur compound is about 20 to 1.

7. A process as in claim 1 wherein R and R¹ together form a steroid of the pregnane series.

8. A process as in claim 1 wherein R and R¹ together form a steroid of the androstane series.

9. A process as in claim 1 wherein R and R¹ together form 9α-fluoro-16α-hydrocortisone acetonide.

References Cited

UNITED STATES PATENTS

| | | | |
|---|---|---|---|
| 3,146,231 | 8/1964 | Dean | 260—239.5 |
| 3,162,629 | 12/1964 | Scheer | 260—239.5 |
| 3,192,202 | 6/1965 | Karmas et al. | 260—239.5 |

ELBERT L. ROBERTS, Primary Examiner

U.S. Cl. X.R.

260—397.3, 397.45